United States Patent [19]

Lesca et al.

[11] Patent Number: 5,338,764
[45] Date of Patent: Aug. 16, 1994

[54] PROCESS FOR THE PREPARATION OF FOAMED PROPYLENE POLYMER ARTICLES

[75] Inventors: Giuseppe Lesca, Milan; Daniele Romanini, Ferrara; Annibale Vezzoli, Como, all of Italy

[73] Assignee: Himont Incorporated, Wilmington, Del.

[21] Appl. No.: 204,013

[22] Filed: Feb. 24, 1994

Related U.S. Application Data

[62] Division of Ser. No. 119,766, Oct. 10, 1993.

[30] Foreign Application Priority Data

Sep. 15, 1992 [IT] Italy .................. MI92 A 002123

[51] Int. Cl.$^5$ ................................ C08J 9/16
[52] U.S. Cl. .......................... 521/60; 521/79; 521/142; 521/143; 526/351; 526/348.1

[58] Field of Search ............... 526/351, 348.1; 521/60, 521/142, 143, 79

[56] References Cited

U.S. PATENT DOCUMENTS

| | | |
|---|---|---|
| 4,840,973 | 6/1989 | Kuwabara et al. . |
| 4,916,198 | 4/1990 | Scheve et al. . |
| 5,026,736 | 6/1991 | Pontiff . |
| 5,047,485 | 9/1991 | DeNicola . |

FOREIGN PATENT DOCUMENTS

| | | |
|---|---|---|
| 0224265 | 11/1986 | European Pat. Off. . |
| 0248305 | 5/1987 | European Pat. Off. . |
| 62-130831 | 2/1980 | Japan . |

*Primary Examiner*—Morton Foelak

[57] ABSTRACT

Foamed propylene polymer articles are prepared by subjecting pre-foamed beads, that consist essentially of propylene polymers having a melt strength from 5 to 40 cN, to thermoforming by sintering.

3 Claims, No Drawings

PROCESS FOR THE PREPARATION OF FOAMED PROPYLENE POLYMER ARTICLES

This application is a division of application Ser. No. 08/119,766, filed Oct. 10, 1993, pending.

The present invention relates to a process for preparing foamed beads of propylene polymers, as well as to the foamed beads thus obtainable and to a process for preparing foamed propylene polymer articles by using said beads.

It is known that foamed polypropylene possesses chemical inertia, heat resistance, stiffness and impact resistance characteristics far superior to those of foamed polystyrene. Therefore, it is obvious that there is an interest in using foamed polypropylene in application fields where the foamed polystyrene cannot be used, or in fields where the foamed polystyrene is widely used, such as insulation and packaging for example, but it does not completely satisfy the demands of the users in terms of performance.

One process which is used for the manufacturing of foamed polystyrene products, sometimes quite thick and with a complex shape, comprises the thermoforming of pre-foamed beads by sintering. However, this technique, although attractive because it can potentially be used for the preparation of articles with the most diverse shapes, is not easy to apply in the case of polypropylene. In fact, the foamed polypropylene articles thus obtained tend to show poor cohesion between the single pre-foamed beads. Moreover, it is very difficult to eliminate the voids between said pre-foamed beads. Many approaches have been tried in order to prevent this drawback. For example, according to U.S. Pat. No. 4,840,973, one can obtain excellent foamed polypropylene articles by pre-treating the pre-foamed beads made up of a particular random copolymer of propylene with ethylene. The pre-foamed beads, as shown in the examples, must be previously subjected to a long pressurization treatment in compressed air. According to U.S. Pat. No. 5,026,736, the foamed polyolefin articles (polypropylene is cited as one of them), are obtained by subjecting pre-foamed beads to thermoforming by sintering, said beads preferably consisting of cross-linked polymer and being obtained in collapsed form. The above approaches, as explained in the above mentioned U.S. Pat. No. 5,026,736, avoid the use of complicated and costly pressure thermoforming techniques, which otherwise would be necessary in order to obtain a good cohesion among the pre-foamed beads and eliminate the voids among same. One example of pressure thermoforming pre-foamed polyolefin beads is based on the use of molds maintained under pressure with compressed gas, such as air, during the initial stage of thermoforming, followed by the sintering of the beads, which can be obtained by injecting steam under pressure. The cohesion among the pre-foamed beads is obtained by bringing the mold back to atmospheric pressure, so that the beads can reexpand and adhere to each other, thus eliminating voids. As an alternative, the compression of the pre-foamed beads can be obtained by reducing the volume of the mold by way of one or more movable walls.

The Applicant has now perfected a process for the production of foamed articles by preparing pre-foamed propylene polymer beads by extrusion and then subjecting said beads to thermoforming by way of sintering, which process not only does not require a thermoforming under pressure, but also allows to avoid the pretreatment described in U.S. Pat. No. 4,840,973. Moreover the process of the present invention allows the use of uncollapsed beads.

The Applicant has found that one can achieve the above advantages by using pre-foamed propylene polymer beads consisting essentially of a propylene polymer having a melt strenght from 5 to 40 cN, i.e. a propylene polymer having a high elongation viscosity in the molten state.

The melt strength can be measured by the specific method described below.

A propylene polymer having said melt strength values can be one wherein at least part of the macromolecular chains are branched, i.e. these are lateral chains where only one of their extremities is bonded to the macromolecular chain.

It has also been found that the above high melt strength values render the propylene polymer more workable during the production of pre-foamed beads. Thus one obtains, without particular difficulty, pre-foamed polypropylene beads of good quality, i.e., having a regular cellular structure with cells having small dimensions.

On the other hand, when using conventional propylene polymers, i.e. without having low melt strength values, the Applicant has found that the processing of the pre-foamed beads by extrusion experiences considerable problems, so that the quality of the resulting pre-foamed beads is unsatisfactory.

A further advantage of the present invention is the fact that the processing waste produced in thermoforming by sintering process, as well as the articles which have been obtained with the same technique and have been already used, can be reconverted into pre-foamed beads by using the extrusion processes which will be described below, since the polymer is not cross-linked.

Accordingly, the present invention provides a process for the preparation of foamed beads of propylene polymers, comprising extruding a propylene polymer having a melt strength from 5 to 40 cN in the presence of a foaming agent.

Moreover, the present invention provides foamed beads of propylene polymers, said beads being obtained by extruding a propylene polymer having a melt strength from 5 to 40 cN in the presence of a foaming agent.

According to another embodiment, the present invention provides a process for the preparation of foamed propylene polymer articles, comprising thermoforming by sintering foamed beads of a propylene polymer having a melt strength from 5 to 40 cN.

Preferably the foamed beads prepared and used according to the present invention have a poured bulk density from 10 to 500 kg/m$^3$, more preferably from 15 to 200 kg/m$^3$, and an average cell diameter from 50 to 2000 $\mu$m, more preferably from 100 to 800 $\mu$m. It is also preferable that the average diameter of the foamed beads be from 1 to 10 mm.

Moreover, in order to obtain particularly good processability and finished articles having the best properties, it is preferable that the MIL (melt index, condition L) values (ASTM D 1238) of the propylene polymers be comprised between 0.5 and 10 g/10 min., more preferably between 1 and 6 g/10 min.

The propylene polymers having, in whole or in part, a branched molecular structure, and that can be used for the preparation of the pre-foamed beads and the articles of the present invention comprise the homopolymers of propylene and its copolymers thereof containing from 1 to 40% by weight, preferably from 3 to 30%, of ethylene and/or α-olefins, linear or branched, having 4–10 carbon atoms or mixtures of the above polymers. Among the copolymers are the crystalline propylene random copolymers containing from 1 to 25% by weight, preferably from 3 to 20% by weight, of ethylene and/or α-olefins having 4–10 carbon atoms, as well as the olefin polymer elastomers (EPR rubbers, for example), and the heterophasic blends comprising one or more crystalline polymers chosen from the above mentioned homopolymers of propylene and its random copolymers, and one or more of the above olefin elastomers. The heterophasic mixtures can also contain minor quantities of homo- and copolymers of ethylene (from 5 to 20%, for example). Examples of α-olefins having 4–10 carbon atoms that can be present in the above polymers are: 1-butene; isobutylene; 1-pentene; 3-methyl-1-butene; 1-hexene; 3,4-dimethyl-1-butene; 1-heptene; and 3-methyl-1-hexene.

As previously stated propylene polymers characterized by high melt strength values, can be polymers consisting of or comprising polymers having, at least in part, a branched molecular structure. Said structure can be obtained with various techniques starting from conventional linear polymers prepared with processes based on coordination catalysis, in particular using low- or high-yield Ziegler-Natta catalysts. In particular, it is possible to subject the linear polymers to controlled modification processes by way of free radical generators such as peroxides or radiation. A preferred technique comprises the treatment of linear polymers with high energy radiation (such as electrons and gamma radiations) by the method described in U.S. Pat. No. 4,916,198 which method is incorporated herein by reference. For example, the amount of radiation is from 0.25 to 20, preferably 3–12, MRad, low amounts of radiation being preferred when ethylene polymers are present. The radiation intensity, for example, is from 1 to 10,000, preferably from 18 to 2,000 MRad per minute.

As previously stated, it is also possible to obtain the branched structure by treating the linear polymers with organic peroxides, by the method described in U.S. Pat. No. 5,047,485, for example, which method is incorporated herein by reference. The linear polymers are blended with peroxides, and brought to a temperature which is sufficiently high to decompose the peroxides, thus obtaining the formation of free radicals which react with the polymer chain to form long chain radicals, which then recombine and form the branched structure. In particular, in order to obtain said branched structure one must select the proper peroxides with a half-life decomposition time less than or equal to 5 minutes at temperatures ranging from 90° C. to 120° C., less than or equal to 40 minutes at temperatures ranging from 60° C. to 90° C., less than or equal to 60 minutes at temperatures ranging from 25° C. to 60° C.

Examples of peroxides having the above properties are: di(sec.butyl)peroxydicarbonate; bis(2-ethoxy)-peroxydicarbonate; di-cyclohexyl peroxydicarbonate; di-n-propyl peroxydicarbonate; di-isopropyl peroxydicarbonate; di-n-butyl peroxydicarbonate; di-sec-butyl peroxydicarbonate; tert-butyl peroxydeneocanoate; tert-amyl peroxyneodecanoate; tert-butyl peroxypivalate. The quantities of peroxide used are generally comprised between 0.005 and 0.5 mmoles/g of linear polymer. The treatment temperature is generally lower than or equal to 120° C. In both the above types of treatment, after sufficient time to allow a substantial recombination of the long chain free radicals generated, the remaining free radicals are deactivated.

The above treatments are preferably conducted on linear polymers having a crystallinity equal to at least 5–10%, measured by way of X-ray diffraction. However, polymers with a lower crystallinity (olefin polymer elastomers, for example) can be present, as long as the melt strength of the polymer mass of the pre-foamed beads is comprised within the above mentioned limits.

Likewise, other thermoplastic or elastomeric polymers can also be present, as long as the above condition is observed. Obviously, one does not exclude from the scope of the present invention other possible methods of preparing propylene polymers having the above mentioned properties, such as direct synthesis in polymerization, for example.

Generally, the branching index in the polymers that can be used according to the present invention ranges from 0.1 to 0.9, preferably from 0.25 to 0.7.

As cited in the above mentioned U.S. Pat. No. 4,916,198, said branching index (g) is represented by the ratio $$g = \frac{[\eta]_{Br}}{[\eta]_{Lin}},$$

where $[\eta]_{Br}$ and $[\eta]Lin$ are, respectively, the intrinsic viscosities (determined in decahydronaphthaline at 135° C.) of the branched polymer and the corresponding nonbranched one having the same weight average molecular weight. By using the above polymers, the pre-foamed beads of the present invention are preferably prepared by extrusion in the presence of foaming agents.

In particular, by using, as foaming agents in extrusion, hydrocarbons, optionally fluoridated and/or chlorinated, having a boiling point higher than 25° C., such as for example pentane, hexane, dichlorotrifluoroethanes, and methylene chloride, one can obtain foamed beads whose cellular structure is at least partly collapsed. By using gaseous or liquid foaming agents having boiling temperatures lower than 25° C., such as for example air, nitrogen, carbon dioxide, chloro-difluoromethane, dichlorodifluoromethane, butane, propane and isobutane, one can obtain foamed beads with a cellular structure which does not collapse at ambient temperature and pressure even after prolonged storage.

In order to prepare the foamed beads one can use extruders commonly known in the art, including single-screw extruders. The foaming agent is preferably injected into the melted polymer mass inside the extruder, from a part downstream from the point at which the solid polymer is feed into the extruders so that the distance between will allow the polymer to have reached the form of a melted, homogeneous mass. In the section of the extruder where the foaming agent is introduced, the temperature preferably ranges from 125° C. to 250° C. The temperature maintained at the extruder outlet, equipped with a die having round holes of the appropriate diameter, is the most adequate to obtain the foaming of the polymer, and it preferably ranges from 125° C. and 180° C. The quantity of foaming agent that is added to the polymer ranges preferably from 1 to 30% by weight with respect to the polymer, more preferably from 2 to 15%.

It may be also advisable to add to the polymer mass, before or during extrusion, one or more nucleating agents (cell-forming nucleating agents), in quantities generally ranging from 0.5 to 3% by weight with respect to the polymer. Examples of the above mentioned nucleating agents are: talc, colloidal silica, sodium bicarbonate or its blends with citric acid, azo-derivatives such as azodicarbonamide.

Other additives, dyes or fillers that may optionally be required, can be added before or during extrusion. The strands of foamed polymer exiting from the extruder dies are cut in segments, by way of rotating blades for example, thus obtaining foamed beads. The length of said segments is generally such that one obtains round or oval beads (due to the foaming), or cylinders having a height comparable to the base diameter (generally speaking the height is from 0.5 to 3 times the base diameter).

Normally, the foamed beads obtained in this manner are kept at atmospheric temperature and pressure for a time sufficient to achieve the equilibrium between the pressure inside the cells and the one outside (curing). Said period generally ranges from 10 to 30 hrs.

As previously stated, the finished foamed polypropylene articles can be easily prepared by thermoforming the above mentioned pre-foamed beads by sintering. In particular, it is sufficient to fill a mold having the desired dimensions with pre-foamed beads and heat said beads to the proper temperature to obtain finished articles with a homogeneous structure, essentially without voids between the beads, and having excellent mechanical properties. By using the pre-foamed beads of the present invention one does not need to maintain the molds under pressure during the sintering step, or use molds having movable walls. On the contrary, the entire step of thermoforming by sintering is preferably carried out at substantially atmospheric pressure. By "substantially atmospheric pressure" one means that no overpressure is applied inside the molds where the sintering occurs, except for possible overpressures deriving from the passage of hot pressurized gases through the molds. As explained below, the above gases are used to heat the polymer mass uniformly and obtain the sintering. The molds can also be filled at atmospheric pressure. Once the filling phase is completed, the sintering is done by heating the mass of pre-foamed beads contained in the mold. In order to obtain homogeneous heating, it is best to introduce into the mold a gas heated under pressure, such as super-heated steam for example (usually at 160°–180° C.). The sintering temperature generally ranges from 120° C. to 180° C., preferably from 130° C. and 160° C.

The following examples are given in order do illustrate and not limit the present invention.

The melt strength values reported in the examples are obtained by using the following method.

The apparatus used is the Rheotens melt tension instrument model 2001, manufactured by Gottfert (Germany); the method consists of measuring in cN (centiNewtons) the tensile strength of a strand of molten polymer operating at a specific stretch velocity. In particular, the polymer to be tested is extruded at 200° C. through a die with a capillary hole 22 mm long and 1 mm in diameter; the exiting strand is then stretched, by using a system of traction pulleys, at a constant acceleration of 0.012 cm/sec$^2$, measuring the tension until the breaking point. The apparatus registers the tension values of the strand (resistance in cN) as a function of the stretching. The maximum tension value corresponds to the melt strength.

EXAMPLE 1

A blend consisting of 99 parts by weight of branched propylene homopolymer having a melt flow rate condition L (MFR/L) of 3 g/10 min., a 4% by weight fraction soluble in xylene at 25° C., a branching index 0.56, and a melt strength of 23 cN, and 1 part by weight of Hydrocerol nucleating agent, marketed by Boehringer, is introduced at a flow rate of 75 kg/h in a Berstorff single-screw extruder (screw diameter: 90 mm; L/D ratio=40) maintained at a temperature of 230° C.

The branched structure in the above polypropylene was obtained by subjecting a linear polypropylene having a MFR/L=0.4 g/10 min, a 4% by weight of fraction soluble in xylene at 25° C., and a melt strength=8 cN, to a 12 MRrad electron beam radiation (produced by a 2 MeV Van De Graaf generator) for 3 seconds, and then to a heat treatment at 80°–140° C. in a nitrogen-flow fluid bed for 200 minutes.

At the same time, a mixture consisting of 70/30 by weight of n-butane/isobutane (foaming agent) in a quantity equal to 5% with respect to the polypropylene is introduced in the extruder. The part where the mixture is introduced in the extruder is located at a distance from the feed hopper equal to 16 D (D=screw diameter), i.e., 16×90 mm=1440 mm. Prior to exiting the extruder the melted mass, made up by the polymer, the nucleating agent, and the foaming agent, has a temperature of 160° C. and a pressure of 100 atmospheres.

The strands exiting the extruder die, which is positioned at a 90° angle with respect to the extruder axle, are cut using a rotating-blades system. The resulting foamed beads have the form of a partially ovalized cylinder (due to the foaming action), and an average dimension of 3×4 mm.

The cellular structure of the foamed product is medium-fine, with an average diameter of each cell ranging from 300 to 600 $\mu$m (optical microscopy). The poured bulk density of the pre-foamed beads is 30 Kg/m$^3$ (ASTM D 3575 method).

After a 24 hour curing period at ambient temperature the pre-foamed beads are subjected to thermoforming by sintering. The poured bulk density of the pre-foamed beads after curing has been reduced to 26 Kg/m$^3$. The internal form of the mold used for the sintering tests is that of a 70×70×70 mm cube, and the walls have a number of 1 m-diameter holes for the steam to pass through.

10 g of pre-foamed beads are introduced into the mold, and then one proceeds to the thermoforming step with steam at 5 atm. and 165° C. for a period of 12 seconds.

The foamed article thus obtained presents a perfect form, and the visual analysis of its cross-section shows a perfect union and fusion of the beads. The density of the foamed article is 29 Kg/m$^3$ (ASTM D 3575 A).

EXAMPLE 2

In the extruder described in Example 1 is introduced a mixture comprising 75 part by weight of the branched polypropylene used in Example 1, 10 parts by weight of nonbranched linear propylene homopolymer having MFR/L=4.0 g/10 min., a 2% by weight of fraction soluble in xylene at 25° C., and a melt strength=3 cN, 15 parts by weight of nonbranched propylene/ethylene copolymer containing 21% by weight of ethylene and having MFR/L=0.45 g/10 min. and a 65% by weight of fraction soluble in xylene at 25° C., and 1 part by weight of the nucleating agent used in Example 1. The foaming agent, its introduction, and the extrusion conditions are the same as for Example 1. The pressure of the molten mass before the extruder output is 130 atm. and the temperature 155° C.

The pre-foamed beads thus obtained have a poured bulk density equal to 30 Kg/m³, which at the end of the curing period decreases to 27 Kg/m³.

The thermoforming by sintering of the pre-foamed beads, carried our according to the process set forth in Example 1, provides articles with beads perfectly fused together and having a density of 30 Kg/m³.

EXAMPLE 3

The procedure and ingredients of Example 1 are repeated, but in this case isopentane is used as the foaming agent.

The temperature of the melt before exiting the extruder is 140° C., and the pressure is 138 atm. The pre-foamed beads thus obtained have the form of partially collapsed cylinders. In particular, the cellular structure of the foamed product is medium-fine, with an average cell diameter ranging from 200 and 500 μm. The poured bulk density of the beads is 44 Kg/m³, which decreases to 42 Kg/m³ after curing for 24 hours at ambient temperature.

The thermoforming by sintering tests carried out in the cubic mold, according to the process described in Example 1, supply articles with perfectly fused beads having a density of 40 Kg/m³.

EXAMPLE 4 (COMPARATIVE)

The procedure and ingredients of Example 1 are repeated, but in this case a nonbranched propylene homopolymer having a MFR/L=1.8 g/10 min., a 4% by weight of fraction soluble in xylene at 25° C., and a melt strength=2.7 cN is used.

The pressure measured prior to exiting the extruder is 125 atm., and the temperature 154° C.; however, after the strands exiting the extruder die, when subjected to the rotating blades, they are not cut, but result in stretched and frayed strands. Even when increasing the amount of foaming agent (butane/isobutane) to 8% by weight with respect to the polypropylene, one does not obtain foamed beads.

Other features, advantages and embodiments of the invention disclosed herein will be readily apparent to those exercising ordinary skill after reading the foregoing disclosures. In this regards, while specific embodiments of the invention have been described in considerable detail, variations and modifications of these embodiments can be effected without departing from the spirit and scope of the invention as described and claimed

What is claimed is:

1. Foamed beads produced by a process comprising extruding a propylene polymer having (a) a melt strength from 5 to 40 cN and (b) at least part of its macromolecular chains branched in the presence of a foaming agent and cutting the strand of said propylene polymer after the strand exits the extruder die to form the foamed beads.

2. Foamed beads produced by the process of claim 1 wherein the propylene polymer is selected from the group consisting of propylene homopolymers and propylene copolymers containing from 1 to 40% by weight of ethylene or an α-olefins, linear or branched, having 4–10 carbon atoms or mixtures thereof.

3. Foamed beads produced by the process of claim 1, having an average cell diameter from 500 to 2000 μm and a poured bulk density from 10 to 500 kg/m³.

* * * * *

UNITED STATES PATENT AND TRADEMARK OFFICE
CERTIFICATE OF CORRECTION

PATENT NO. : 5,338,764

DATED : August 16, 1994

INVENTOR(S) : Giuseppe Lesca et al.

It is certified that error appears in the above-identified patent and that said Letters Patent is hereby corrected as shown below:

Col. 6, line 49, "1 m-diameter" should be --1 mm-diameter--

Signed and Sealed this

Eleventh Day of July, 1995

Attest:

BRUCE LEHMAN

Attesting Officer    Commissioner of Patents and Trademarks